United States Patent [19]
Wade et al.

[11] Patent Number: 5,906,432
[45] Date of Patent: May 25, 1999

[54] DOUGH MIXER APPARATUS FOR LABORATORY TESTING OF THE DEVELOPMENT OF A DOUGH SAMPLE

[75] Inventors: William W. Wade, Prairie Village, Kans.; Nathaniel Wade Duncan, Marietta, Ga.; Charles D. Luse, Bucyrus; Aaron J. Dirks, Overland Park, both of Kans.

[73] Assignee: American Ingredients Company, Kansas City, Miss.

[21] Appl. No.: 08/934,443

[22] Filed: Sep. 19, 1997

[51] Int. Cl.$^6$ ........................................................ A21C 1/00
[52] U.S. Cl. ............................ 366/97; 366/100; 366/142; 366/320
[58] Field of Search ................................. 366/97, 98, 99, 366/142, 199, 206, 287, 288, 325.6, 325.5, 325.4, 325.3, 325.94, 331, 320, 343, 100; 99/348

[56] References Cited

U.S. PATENT DOCUMENTS

| | | | |
|---|---|---|---|
| 1,783,437 | 12/1930 | Laib | 366/98 |
| 2,610,269 | 9/1952 | Van Guilder | 366/206 |
| 4,131,034 | 12/1978 | Rolf | 366/288 |
| 4,311,397 | 1/1982 | Wright | 366/287 |
| 4,704,035 | 11/1987 | Kowalczyk | 366/288 |
| 4,747,690 | 5/1988 | Hayashi | 366/98 |
| 4,766,766 | 8/1988 | Ahlert et al. | 366/98 |
| 4,790,665 | 12/1988 | Hayashi | 366/98 |
| 5,520,458 | 5/1996 | Arutyunov et al. | 366/325.94 |

FOREIGN PATENT DOCUMENTS

| | | | |
|---|---|---|---|
| 558762 | 6/1958 | Canada | 366/288 |
| 1238783 | 6/1986 | U.S.S.R. | 366/287 |

*Primary Examiner*—Tony G. Soohoo
*Attorney, Agent, or Firm*—Hovey, Williams, Timmons & Collins

[57] ABSTRACT

A dough mixing apparatus for use in a bakery laboratory in order to test formulas and ingredients includes an upright mixing machine, a bowl with an upstanding center pin and a pair of dough arms approximating a double helix configuration. In operation, the mixing machine rotates the arms about their axes and eccentrically about the center pin to ensure efficient kneading and rapid dough development. The preferred apparatus also includes a strain gage for monitoring the torque on the dough arms and displaying a graph on a PC monitor of the torque over time in relation to a specification curve for monitoring dough development.

27 Claims, 4 Drawing Sheets

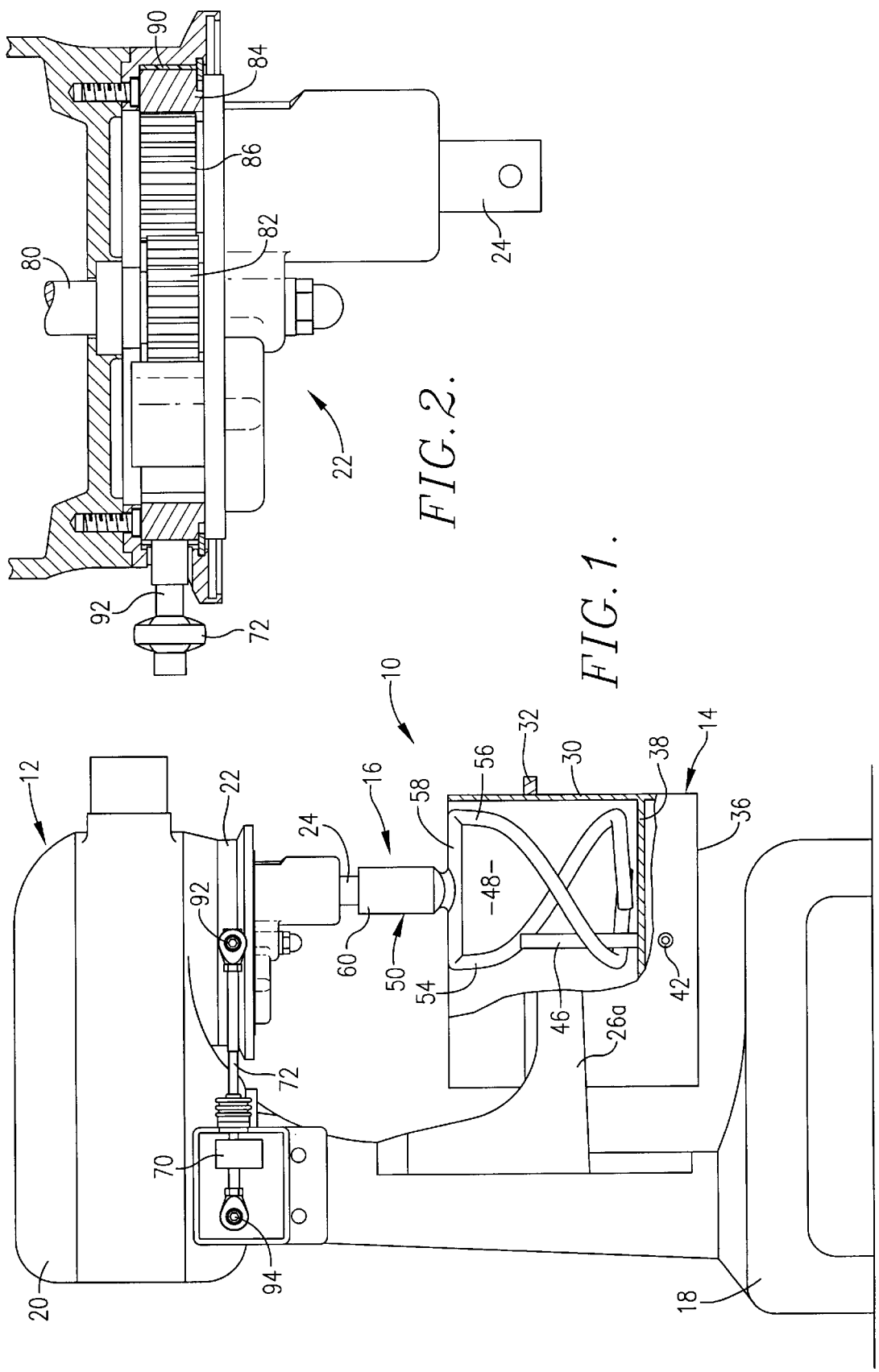

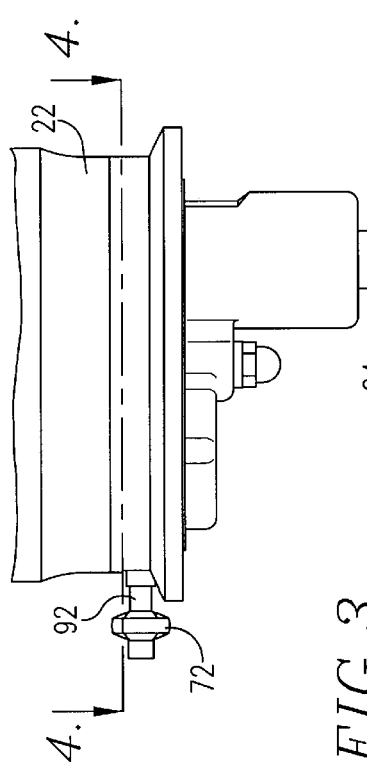
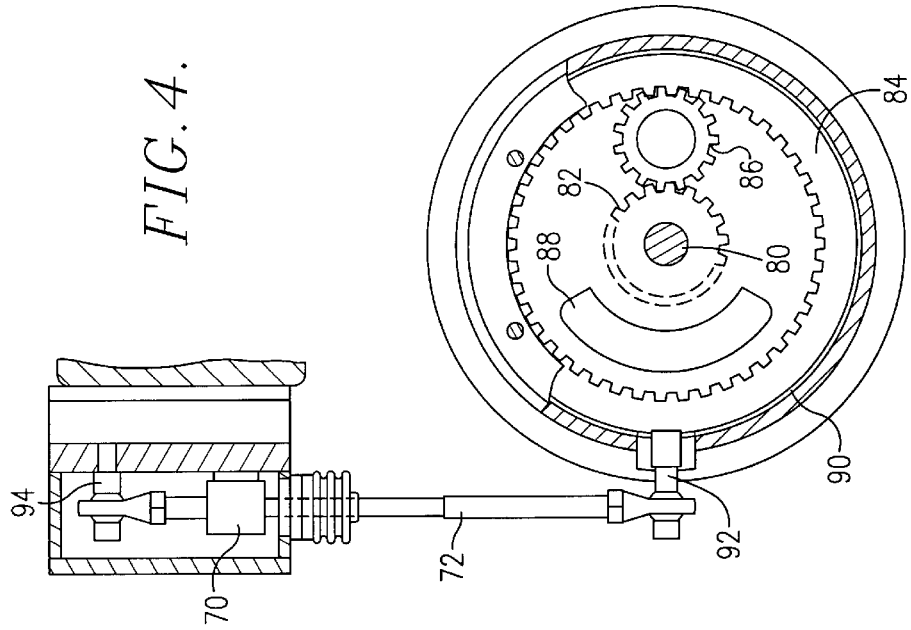
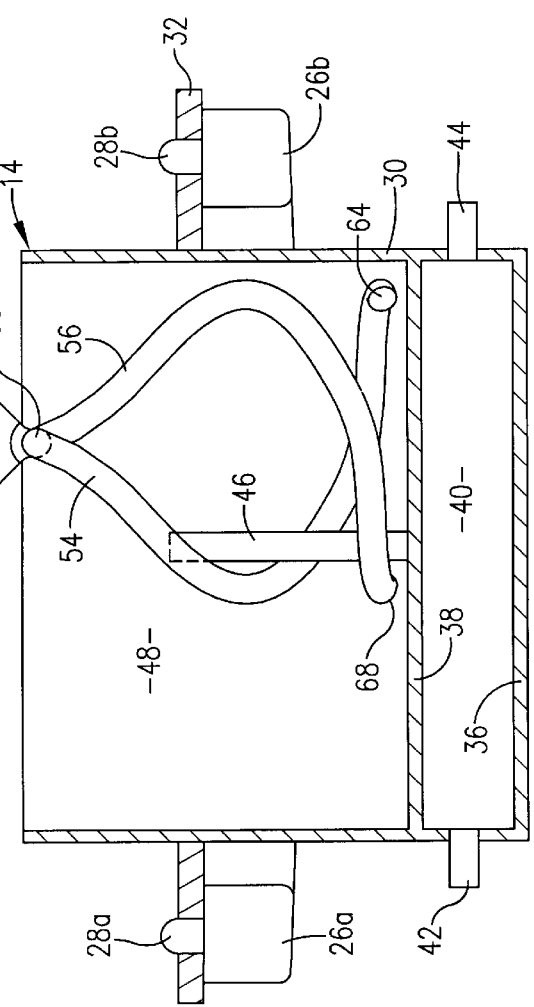

| TIME | 2 | 4 | 6 | 8 | 10 | 12 |
|---|---|---|---|---|---|---|
| SPEC | 71.8 | 77.2 | 81.2 | 82.0 | 79.0 | |
| MIX | 67.5 | 72.7 | 77.0 | 80.1 | 89.7 | |

| TIME | 2 | 4 | 6 | 8 | 10 | 12 |
|---|---|---|---|---|---|---|
| SPEC | 71.8 | 77.2 | 81.2 | 82.0 | 79.0 | |
| MIX | 67.5 | 72.7 | 77.0 | 80.1 | 89.7 | |

5,906,432

DOUGH MIXER APPARATUS FOR LABORATORY TESTING OF THE DEVELOPMENT OF A DOUGH SAMPLE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The present invention relates to the field of baking. In particular, the invention is concerned with a dough mixing apparatus for use in a bakery laboratory in order to test formulas and ingredients, and includes an upright mixing machine, a bowl with an upstanding center pin and a pair of dough arms approximating a double helix configuration. In operation, the mixing machine rotates the arms about their axes and eccentrically about the center pin to ensure efficient kneading and rapid dough development. The preferred apparatus also includes a strain gage for monitoring the torque on the dough arms and displaying a graph on a PC monitor of the torque over time in relation to a specification curve for monitoring dough development.

2. Description of the Prior Art

A typical bakery for baking breads, pastries and the like includes a laboratory for testing the various formulas and ingredients. Testing is performed in the laboratory, for example, when a formula is changed or upon receiving a new batch of ingredients such as a new batch of flour.

To perform a test, a formulation is mixed in a conventional upright mixer such as a Hobart mixer. The ingredients of a selected formula or recipe are added to the bowl and mixed to form a dough. A conventional test mixer includes dough arms in the nature of a pair of spaced, straight rods that are rotated eccentrically about a center pin in the mixing bowl. The arms mix the ingredients and knead the dough until the dough is properly developed.

As those skilled in the art appreciate, this type of test mixer does not simulate realistically the dough development that occurs in a horizontal production machine. Moreover, this type of test mixer is very inefficient in that a portion of the dough often agglomerates around the center pin of the bowl and rotates thereabout without being properly kneaded. Also, a determination as to when the test dough is properly developed is strictly a subjective judgment by the operator. This judgment is based upon the look and feel of the dough.

SUMMARY OF THE INVENTION

The present invention solves the prior art problems discussed above and presents a distinct advance in the state of the art. In particular, the dough mixing apparatus hereof efficiently mixes and kneads a test batch of the dough in a manner more simulative of a horizontal production machine and provides for more objective analysis of dough development.

The preferred dough mixing apparatus includes a mixing machine, a mixing bowl with an upstanding center pin, and a mixer assembly including a pair of dough arms approximating the configuration of a double helix. The mixing machine rotates the dough arms about their respective axes and eccentrically around the center pin. This arrangement provides for very efficient mixing and kneading thereby reducing the dough development time, and also improves the thoroughness of the mix itself thereby reducing stratification.

The preferred mixer assembly also includes a strain gage that senses the amount of force exerted on the dough arms by the mixing machine, and a signal processor such as a personal computer coupled with the strain gage for processing the sensing signals thereof and for producing a graphical mix display on the computer monitor illustrating the amount of force versus time. This is presented in superposed relationship with a graph of a specification display for comparison reference by the operator. In preferred forms, the strain gage senses the amount of torque imposed on the dough arms. Other preferred aspects of the present invention are disclosed herein.

BRIEF DESCRIPTION OF THE DRAWINGS

FIG. 1 is a side elevational view of a portion of the preferred apparatus in accordance with the present invention with portions cut away for clarity of illustration and in partial section;

FIG. 2 is a side elevational view in partial section of the gear housing of the apparatus of FIG. 1;

FIG. 3 is a side elevational view of the gear housing of FIG. 2 shown coupled with the preferred dough arms positioned in a mixing bowl shown in section;

FIG. 4 is a partial sectional view taken along line 4—4 of FIG. 3;

DETAILED DESCRIPTION OF THE PREFERRED EMBODIMENT

Figure 6:
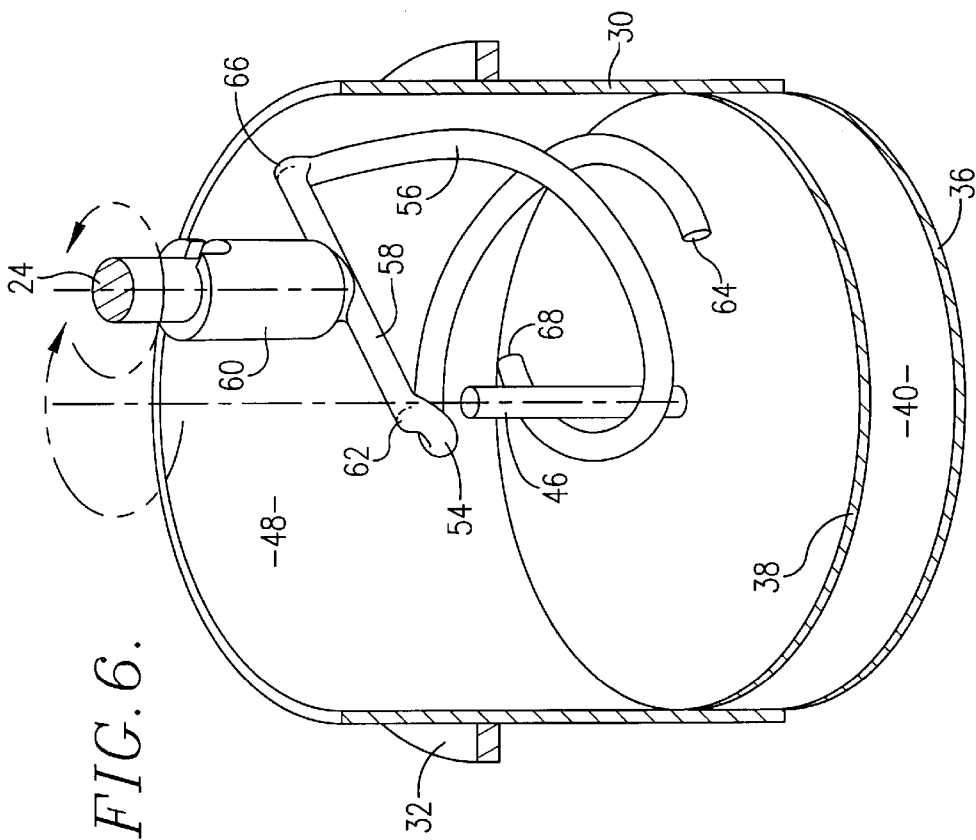
FIG. 6 is a front pictorial view of the mixing bowl of FIG. 1 in partial section illustrating the rotation of the dough arms therein during operation.

The drawing figures illustrate preferred dough mixing apparatus 10 in accordance with the present invention. Apparatus 10 includes mixing machine 12, mixing bowl 14 and dough mixer assembly 16.

Referring to FIGS. 1–4, mixing machine 12 is conventional in nature (except as modified in accordance with the present invention as explained further herein) such as a conventional twenty quart Hobart mixer typically used for mixing 1300 gram or 700 gram doughs. Machine 12 includes base 18, drive housing 20 and gear housing 22 with output shaft 24 extending downwardly therefrom. Machine 12 also includes support arms 26a and 26b configured for supporting mixing bowl 14 as best illustrated in FIGS. 1 and 3. Support arms 26a,b present respective, upstanding locating pins 28a and 28b.

Mixing bowl 14 (preferably a so-called McDuffey bowl) includes side wall 30 with mounting ring 32 extending therearound and having mounting holes 34a and 34b defined therein for registering with and receiving locating pins 28a,b respectively for positioning bowl 14. Bowl 14 also includes bottom wall 36 and jacket wall 38 spaced above bottom wall 36 to define jacket 40 therebetween. Fittings 42 and 44 are attached to side wall 30 on opposed sides of jacket 40 as inlet and outlet for controlled temperature water in order to maintain the desired temperature of bowl 14 during use. Bowl 14 also includes center pin 46 upstanding from jacket wall 38 into mixing chamber 48.

Dough mixer assembly 16 includes dough arm device 50 and sensing and display group 52. Dough arm device 50 includes dough arm 54, dough arm 56, connection rod 58 and coupler 60, all preferably composed of stainless steel.

Dough arm 54 is composed of bent rod of stainless steel, presents a generally helical configuration and includes connection end 62 and distal end 64 as best viewed in FIGS. 1, 3 and 6. Similarly, dough arm 56 presents a generally helical configuration and includes connection end 66 and distal end 68. Connection rod 58 interconnects connection ends 62 and 66 in a spaced relationship so that the axes of arms 54, 56 are coincident. In this way, arms 54, 56 approximate the configuration of a double helix. Tubular coupler 60 is welded to connecting rod 58 in axial alignment with the axes of arms 54, 56 and is configured for coupling with output shaft 24 of mixing machine 12.

Figure 8:
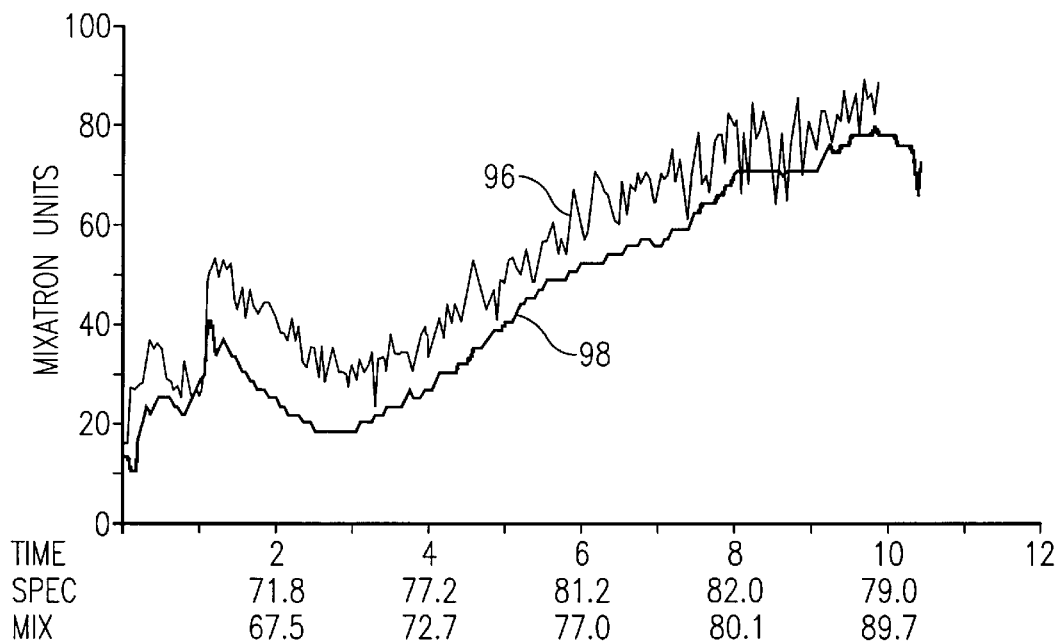
FIG. 8 is an illustration of a first graphical display on the monitor of FIG. 7.
Figure 9:
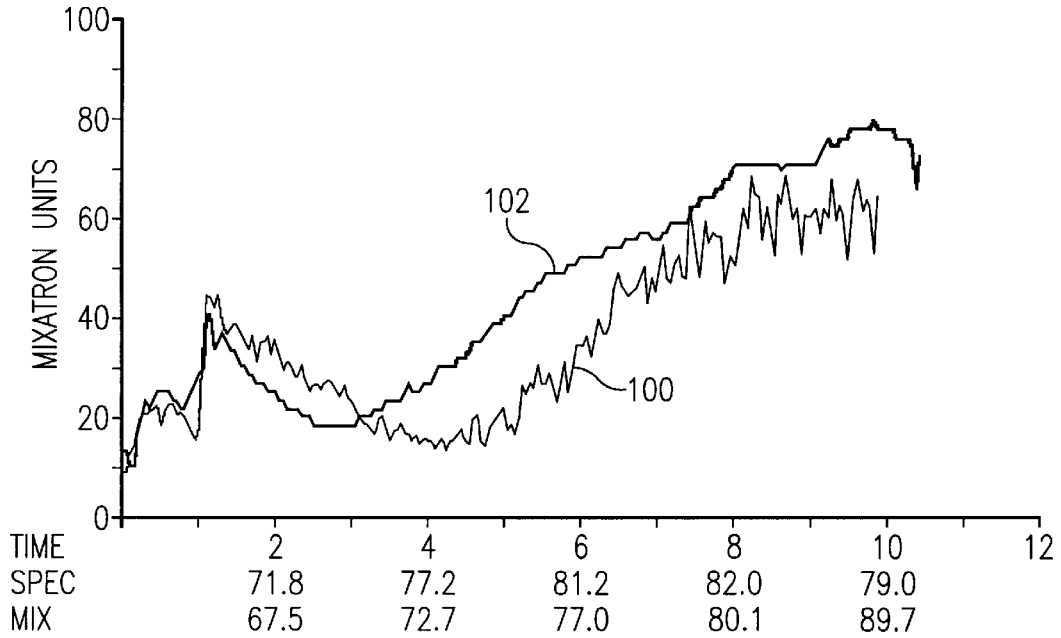
FIG. 9 is an illustration of a second graphical display on the monitor of FIG. 7.

Referring to FIGS. 1, 2, 4 and 7, sensing and display group 52 includes strain gage 70 supported by sensing shaft 72, amplifier 74, computer 76 and monitor 78. Strain gage 70 is conventional in nature and produces a voltage signal representative of the force sensed thereby. In the preferred embodiment, strain gage 70 senses the amount of force in the nature of torque exerted on the arm device 50 as explained further herein. Amplifier 74 converts the voltage signals from strain gage 70 into standard 4–20 ma. signal provided to computer 76, preferably a personal computer. Computer 76 converts the 4–20 ma. signals into digital signals using an internal analog-to-digital converter (ADC) for processing within computer 76. Under control of a computer program developed using programming techniques known to those skilled in the art, computer 76 produces a graphical illustration (FIGS. 8 and 9) of the sensing signals produced by strain gage 70 versus time on monitor 78 such as a computer monitor. Computer 76 also includes data storage such as a hard drive or the like for storing data representative of past displays or a specification display which can be superimposed on the same illustration with the current mix display as illustrated in FIGS. 8 and 9.

FIGS. 2 and 4 illustrate gear housing 22 of mixing machine 12. Gear housing 22 includes drive shaft 80 presenting drive gear 82, ring gear 84, and planetary gear 86 engaged therebetween. Counterweight 80 is coupled with drive shaft 80 opposite planetary gear 86 and output shaft 24 extends downwardly from planetary gear 86.

In a conventional mixer, ring gear 84 is fixed to the housing of mixing machine 12. In the present invention, however, ring gear 84 is not fixed to the housing but, rather, is provided with bearing 90. Sensing shaft 72 interconnects bolt 92 extending from the periphery of ring gear 84 and bolt 94 extending from the side of drive housing 20. This prevents any substantial rotation of ring gear 84 but allows transmission of force from ring gear 84 to strain gage 70 positioned in sensing shaft 72 between bolts 92 and 94. In this way, strain gage 70 senses the amount of force exerted on dough arm device 50 and on arms 54, 56 as the amount of torque experienced by ring gear 84.

In use, the operator of apparatus 10 adds the ingredients for a particular formula or recipe into mixing bowl 14, placed on support arms 26a,b with locating pins 28a, b received through respective locating holes 34a,b in mounting ring 32. The operator also turns on temperature control water for flow through jacket 40 by way of fittings 42, 44. In the preferred embodiment, apparatus 10 is for testing bread dough and the ingredients including water, flour, yeast, salt and so forth.

Figure 5:
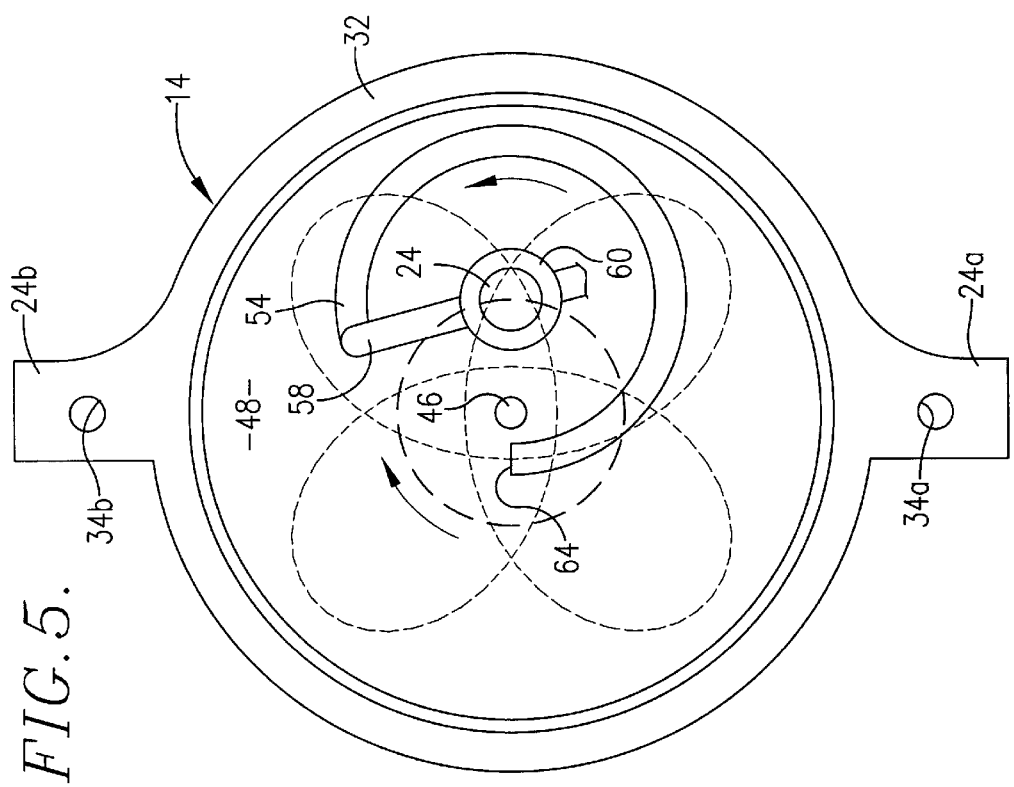
FIG. 5 is a plan view of the mixing bowl of FIG. 1 illustrating a portion of the dough arms with the path of a dough arm during operation illustrated in dashed lines.
Figure 7:
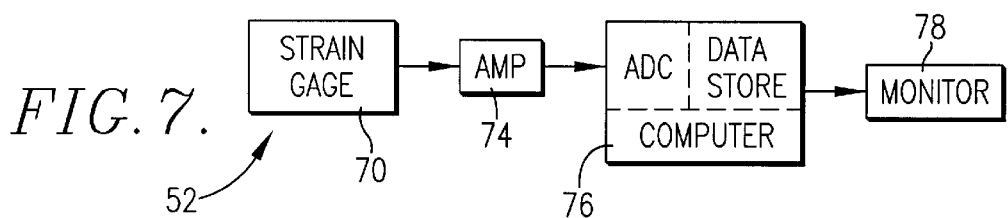
FIG. 7 is an electrical block diagram of the preferred signal processing components of the preferred apparatus in accordance with the present invention.

The operator then turns on mixing machine 12 with dough arm device 50 connected to output shaft 24 as illustrated in FIG. 3. Drive shaft 80 rotates thereby rotating drive gear 82 and planetary gear 86. As planetary gear 86 rotates, it rotates output shaft 24 and thereby rotates dough arms 54, 56 about their coincident axes as illustrated in FIGS. 5 and 6. As planetary gear 86 rotates, it also travels along ring gear 84 thereby eccentrically rotating dough arms 54, 56 about center pin 46. The path of travel of distal end 64 of dough arm 54 is illustrated by the dashed lines in FIGS. 5. The path of travel for distal end 68 of dough arm 56 is similar but displaced by 180°.

In this way, the paths of travel of dough arms 54, 56 substantially cover the entire volume of mixing bowl 14 surrounding center pin 46. Moreover, the helical configurations of arms 54, 56 substantially increase the intensity of the kneading action. As illustrated in FIG. 6, for example, the lower portion of dough arm 54 is near center pin 46 while the upper portion is near bowl side wall 30. In contrast, the lower portion of dough arm 56 is near side wall 30 while the upper portion is adjacent the upper end of center pin 46. Thus, each dough arm 54, 56 presents a portion near center pin 46 and a portion remote therefrom with these relationships reversing during operation.

This structure and operation prevents agglomeration of dough about center pin 46 and provides increased kneading efficiency. For example with the present invention, a dough that might take seventeen minutes to develop using the conventional straight kneading rods can be accomplished in about nine to ten minutes using dough arms 54, 56 of the present invention. Also, this more nearly simulates the dough development time and quality of a conventional production mixer.

FIG. 8 is an illustration of a graphical display presented on monitor 78 during operation of apparatus 10. Mix display 96 illustrates the amount of force exerted on dough arms 54, 56 (in so-called Mixatron units) over time. As mixing occurs in bowl 14, the dough therein begins to develop and as such, the gluten in the flour begins to form long chains thereby adding to the strength of the dough. Thus, the amount of torque exerted on dough arms 54, 56 increases with time as the dough develops.

The second curve in FIG. 8 is specification display 98 retrieved from the data storage of computer 76 and superimposed on the same graph. Specification display 98 represents data from earlier tests that produced a loaf of bread, for example, meeting all of the required attributes such as cell structure, volume, softness and the like. As illustrated in FIG. 8, mix display 96 is generally above specification display 98 indicating that the current mix presents a strong structure. This in turn indicates that more water could be used to obtain a loaf meeting the requirements thereby conserving flour but also adding to shelf life.

In contrast, FIG. 9 illustrates a screen from monitor 78 that includes mix display 100 and specification display 102. In this example, mix display 100 is generally below specification display 102 during the later stages of development.

This indicates that the dough is not as strong as the specification batch and that additional flour may be needed or water reduced in the next mix in order to produce a loaf meeting the quality requirements.

The displays on monitor 78 provide the operator with objective information concerning the development of the dough being tested. With this information, the operator does not need to rely as much on strictly subjective criteria such as the look and feel of the dough. Moreover, this enables a more objective testing of a new batch of ingredients such as a new batch of flour. That is, the graphical information provided to the operator indicates whether the current batch of flour produces a stronger or weaker dough than the previous batch. This, in turn, provides an indication to the production operators concerning needed changes to the amount of flour and water in subsequent production runs.

Also, data from each test can be stored for future reference. This can be important information, for example, to verify that needed tests were conducted and the results of those tests in the event of an unsatisfactory production run.

Those skilled in the art will appreciate that the present invention encompasses many variations in the preferred embodiment described herein. Having thus described the preferred embodiment, the following is claimed as new and desired to be secured by Letters Patent:

1. A dough mixer assembly for use with a dough mixing machine comprising:
    a pair of dough arms each being of generally helical configuration and having respective attachment ends and presenting respective axes;
    coupling means including a connecting rod interconnecting said attachment ends in a spaced relationship for coupling said arms with the mixing machine for rotation thereof about respective axes,
    said connecting rod interconnecting said attachment ends so that said axes are coincident and so that said arms present a configuration approximating a double helix; and
    a bowl providing with an upstanding center pin and being operable for rotating said arms about said axes and eccentrically around the center pin, said arms cooperably presenting means for kneading dough in the bowl and for preventing a portion of the dough from settling around the center pin and thereby avoiding being kneaded.

2. The assembly as set forth in claim 1, said arms being formed from metal rod.

3. The assembly as set forth in claim 2, said arms being composed of stainless steel.

4. The assembly as set forth in claim 1, further including
    sensing means for sensing the amount of force exerted on said arm by the mixing machine and for producing a sensing signal representative thereof,
    signal processing means for receiving said sensing signal and responsive thereto for producing a mix display signal representative thereof, and
    display means for receiving said mix display signal and responsive thereto for producing a graphical mix display representative of said amount of force over time.

5. The assembly as set forth in claim 4, said signal processing means including means for storing specification data representative of a specification for said amount of force over time and for producing specification display signals representative thereof, said display means including means for receiving said specification display signals and responsive thereto for producing a graphical specification display of said specification data in superposed relationship with said mix display.

6. The assembly as set forth in claim 4, said sensing means including a strain gage connected for sensing the torque exerted on said dough arms by said mixing machine.

7. The assembly as set forth in claim 6, the mixing machine including a housing supporting a drive gear, a surrounding ring gear and a planetary gear engaged therebetween having means for connecting with said coupling means, said arm further including means rotatably mounting said ring gear and a sensing shaft interconnecting said housing and ring gear for preventing substantial rotation thereof with said strain gage positioned in said sensing shaft for sensing the amount of torque exerted on said ring gear, such being representative of the amount of force exerted on said arm by the mixing machine.

8. The assembly as set forth in claim 4, said signal processing means including a personal computer.

9. The assembly as set forth in claim 4, said display means including a computer monitor.

10. A dough mixing apparatus comprising:
    a mixing bowl having an upstanding center pin;
    a mixing machine including means for coupling with a dough arm and for eccentrically rotating said dough arm about said center pin; and
    a dough arm having a helical configuration presenting an axis and coupled with said mixing machine for rotation thereby about said axis and eccentrically about said center pin.

11. The apparatus as set forth in claim 10, including a pair of said dough arms having respective attachment ends and presenting respective axes, said apparatus including a connecting rod interconnecting said attachment ends in a spaced relationship.

12. The apparatus as set forth in claim 11, said connecting rod interconnecting said attachments ends so that said axes are coincident and so that said arms present the configuration approximating a double helix.

13. The apparatus as set forth in claim 12, said arms cooperatively presenting means for kneading dough in said bowl and for preventing a portion of the dough from settling around said center pin and thereby avoiding being kneaded.

14. The apparatus as set forth in claim 13, said arms being formed from metal rod.

15. The apparatus as set forth in claim 14, said arms being composed of stainless steel.

16. The apparatus as set forth in claim 10, further including
    sensing means for sensing the amount of force exerted on said arm by said mixing machine and for producing a sensing signal representative thereof,
    signal processing means for receiving said sensing signal and responsive thereto for producing a mix display signal representative thereof, and
    display means for receiving said mix display signal and responsive thereto for producing a graphical mix display representative of said amount of force over time.

17. The apparatus as set forth in claim 16, said signal processing means including means for storing specification data representative of a specification for said amount of force over time and for producing specification display signals representative thereof, said display means including means for receiving said specification display signals and responsive thereto for producing a graphical specification display of said specification data in superposed relationship with said mix display.

18. The apparatus as set forth in claim 16, said sensing means including a strain gage connected for sensing the torque exerted on said dough arms by said mixing machine.

19. The apparatus as set forth in claim 18, said mixing machine including a housing supporting a drive gear, a surrounding ring gear and a planetary gear engaged therebetween having means for connecting with said arms, said apparatus further including means rotatably mounting said ring gear and a sensing shaft interconnecting said housing and ring gear for preventing substantial rotation thereof with said strain gage positioned in said sensing shaft for sensing the amount of torque exerted on said ring gear, such being representative of the amount of force exerted on said arm by said mixing machine.

20. The apparatus as set forth in claim 16, said signal processing means including a personal computer.

21. The apparatus as set forth in claim 16, said display means including a computer monitor.

22. A dough mixing apparatus comprising:
 a mixing bowl having an upstanding center pin;
 a mixing machine including means for coupling with a dough arm and for eccentrically rotating said dough arm about said center pin;
 a dough arm coupled with said mixing machine for rotation thereby in said bowl about said center pin;
 sensing means for sensing the amount of force exerted on said arm by said mixing machine and for producing a sensing signal representative thereof;
 signal processing means for receiving said sensing signal and responsive thereto for producing a mix display signal representative thereof; and
 display means for receiving said mix display signal and responsive thereto for producing a graphical mix display representative of said amount of force over time.

23. The apparatus as set forth in claim 22, said signal processing means including means for storing specification data representative of a specification for said amount of force over time and for producing specification display signals representative thereof, said display means including means for receiving said specification display signals and responsive thereto for producing a graphical specification display of said specification data in superposed relationship with said mix display.

24. The apparatus as set forth in claim 22, said sensing means including a strain gage connected for sensing the torque exerted on said dough arms by said mixing machine.

25. The apparatus as set forth in claim 24, said mixing machine including a housing supporting a drive gear, a surrounding ring gear and a planetary gear engaged therebetween having means for connecting with said arms, said apparatus further including means rotatably mounting said ring gear and a sensing shaft interconnecting said housing and ring gear for preventing substantial rotation thereof with said strain gage positioned in said sensing shaft for sensing the amount of torque exerted on said ring gear, such being representative of the amount of force exerted on said arm by said mixing machine.

26. The apparatus as set forth in claim 22, said signal processing means including a personal computer.

27. The apparatus as set forth in claim 22, said display means including a computer monitor.

* * * * *